United States Patent [19]

Ban

[11] 3,730,533

[45] May 1, 1973

[54] MAGNETIC TAPE CARTRIDGE REMOVING APPARATUS

[76] Inventor: Itsuki Ban, 829, Higashi-Oizumimachi, Nerima-ku, Tokyo, Japan

[22] Filed: Sept. 28, 1970

[21] Appl. No.: 75,875

[30] Foreign Application Priority Data

Sept. 26, 1969 Japan ................................44/76236

[52] U.S. Cl. ..............274/4 F, 274/4 B, 179/100.2 Z
[51] Int. Cl...........................G11b 15/26, G11b 23/12
[58] Field of Search...............242/55.19 A, 197–200; 179/100.2 Z; 274/4 F; 352/72

[56] References Cited

UNITED STATES PATENTS

| | | | |
|---|---|---|---|
| 3,289,962 | 12/1966 | Gellenthin | 274/4 F |
| 3,504,916 | 4/1970 | Ban | 274/4 F |
| 3,512,786 | 5/1970 | Ban | 274/4 F |
| 3,589,733 | 6/1971 | Piotrowski | 274/4 F |

FOREIGN PATENTS OR APPLICATIONS

| | | | |
|---|---|---|---|
| 1,934,808 | 5/1970 | Germany | 274/4 F |

*Primary Examiner*—Leonard Forman
*Assistant Examiner*—Dennis A. Dearing
*Attorney*—Jacobs & Jacobs

[57] ABSTRACT

In a tape player utilizing a plurality of magnetic tape cartridges for playing a vertical stack of a plurality of cartridges from the lowermost to the uppermost in succession in a bottomless enclosure, a magnetic tape cartridge removing apparatus comprises a player cabinet, a platform provided in the cabinet to allow the lowermost cartridge to rest thereon, a movable deck to which a capstan and a magnetic head and the like are mounted for playing the cartridge resting on the platform and in the play position, deck driving means for reciprocally moving the movable deck between the positions to engage the cartridge in the play position and to disengage the same, and a pushing member for pressedly moving the cartridge in the play position from the play position during the time that the deck is moved from the reproducing position by rotational force of the capstan.

3 Claims, 3 Drawing Figures

MAGNETIC TAPE CARTRIDGE REMOVING APPARATUS

BACKGROUND OF THE INVENTION

This invention relates to a tape cartridge player utilizing a plurality of magnetic tape cartridges, and more particularly to a tape cartridge removing apparatus wherein a plurality of cartridges are arranged in a stack and the cartridge in the play position is moved away from the play position upon ending the play to allow the next successive cartridge to be brought into the play position, such that the cartridges are successively played from the lowermost to the uppermost one.

A tape cartridge player of such class that the cartridges in a stack are successively played from the lowermost to the uppermost one has been well known from the disclosure in my U.S. Pat. No. 3,512,786.

In such a tape cartridge player, it is necessary to retract the played cartridge from the play position to play the next cartridge. Since, with this arrangement, many cartridges are stacked on the lowermost one in the play position, a strong force is required to move the cartridge from its original position. In view thereof, the inventor for this application has succeeded in obtaining an apparatus by which the cartridge may be stably and positively moved by utilizing the rotational force for rotating the tape without depending upon member such as an electromagnetic plunger.

SUMMARY OF THE INVENTION

It is, therefore, a primary object of the invention to provide a tape cartridge removing apparatus for a tape cartridge player of such a class that a plurality of tape cartridges are stacked and are successively played from the lowermost to the uppermost one, wherein the cartridge is moved from the play position and the next cartridge is brought into the play position when the play of the lowermost cartridge is completed by use of the rotational force of the capstan for driving the magnetic tape within the cartridge.

Another object of the invention is to provide a tape cartridge removing apparatus wherein a movable deck to which a capstan and a magnetic head and the like are mounted for playing the cartridge in the play position is away from the cartridge when the play of the cartridge in the play position is completed to allow the cartridge to move from the play position and discharge it from the player cabinet.

A further object of the invention is to provide a tape cartridge removing apparatus which comprises an idler wheel selectively engageable with the capstan and rotated thereby, and a pushing member coupled by a crank arm to the idler wheel, the cartridge in the play position being urged by the pushing lever in response to rotation of the idler wheel to keep the cartridge away from the play position.

These and other objects and features and advantages of the invention will become more apparent from the following description by reference made to the accompanying drawings, in which:

DESCRIPTION OF THE PREFERRED EMBODIMENTS

Figure 1:
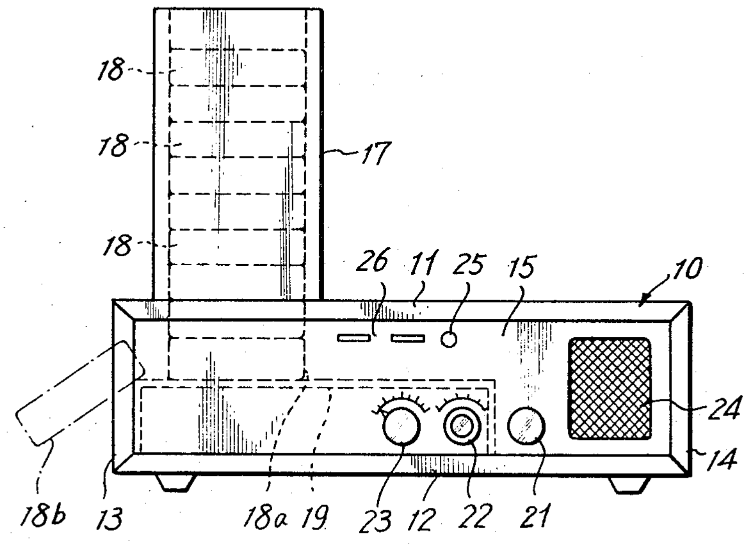
FIG. 1 is a front view of a magnetic tape player according to the present invention.

In FIG. 1, there is shown a tape playing cabinet 10, having top and bottom walls 11, 12, opposed side walls 13, 14, a front wall 15 and a rear wall (not shown). Vertically mounted to the top wall 11 of the cabinet 10 is a bottomless enclosure 17 receiving a stack of plurality of the cartridges 18. The enclosure 17 is a hollow, square pillar and is adapted to receive the cartridges 18 from the upper opening. The top wall 11 is bored through at a portion opposed to the enclosure 17 to allow the lowermost cartridge 18 to rest on a horizontal platform 19 provided within the cabinet 10. According to the invention, the cartridge 18a which rests on the platform 19 is played and finishes its play and then escapes from the cabinet 10 through an opening 20 (FIG. 3) to assume a position indicated at 18*b*. This allows the next cartridge to fall down by its dead weight load to the platform 19 and to rest thereon for its play.

In this manner, the cartridges 18 received in the enclosure 17 are successively played from the lowermost to the uppermost one. The cabinet 10 is provided at its front wall 15 with a power control knob 21 used for controlling operation of the tape player, a volume control knob 22 used for controlling volume of the reproducing sound made out from a speaker 24 on the front wall, and a control knob 23 for a stereo balance setting. A track or channel selection pushbutton 25 on the front wall 15 allows of a change of the track on the magnetic tape. A new track or channel will be selected at each time the pushbutton 25 is depressed and released. The track indicator 26 is provided to show the selected track when the pushbutton 25 is pushed and has selectively lighting lamps corresponding two tracks in this instance.

Figure 2:
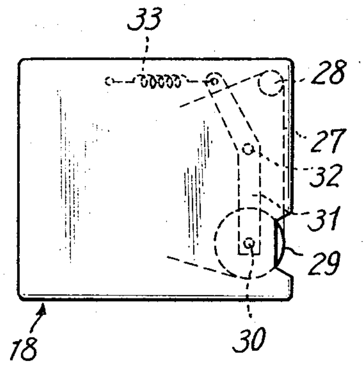
FIG. 2 is a plan view of the tape cartridge played by the player.

FIG. 2 shows a cartridge 18, which includes a generally rectangular housing with a centrally disposed reel assembly (not shown) on which an endless magnetic tape 27 is wound and unwound in conventional manner. The tape 27 passes over a tape guide 28 and a pinch roller 29. The pinch roller 29 is supported by a shaft 30 on one end of a lever 31 which is rotatively supported by a pivot 32 fixed to the base plate of the housing. The pinch roller 29 is urged by a spring 33 in the direction of leading edge of the cartridge. The tape guide 28 and the pinch roller 29 are disposed adjacent the leading edge of the cartridge whereat the cartridge side wall is cut away or dispensed with and the tape 27 is extended from the center of the hub of the reel (not shown) about the guide 28 and thence about the pinch roller 29 back to the outer periphery of a roll formed by the tape wound about the hub.

Figure 3:
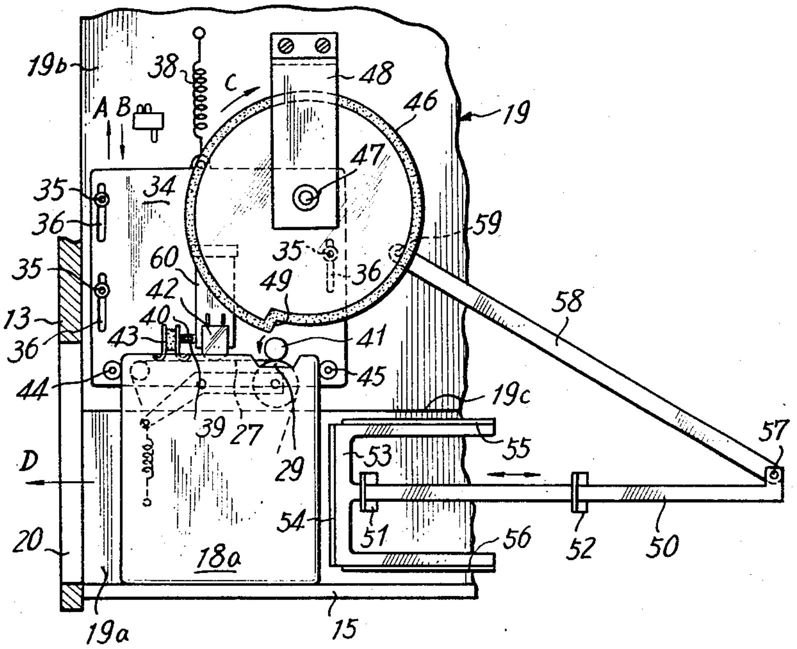
FIG. 3 is a plan view showing a mechanism in the cabinet shown in FIG. 1, the mechanism having a relationship with the present invention.

FIG. 3 shows a mechanism which forms a basis of the invention and is provided in the cabinet 10, wherein similar numerals are used to illustrate like parts in FIGS. 1 and 2. The horizontal platform 19 has a high surface portion 19*a* and a low surface portion 19*b* defined by step portion 19*c*.

Numeral 34 is a deck which is slidably supported by guide rods 35 that passes through elongated slots 36 formed in the deck and mounted to the lower surface position 19*b* of the platform 19. Upward and downward movement of the deck 34 is limited by rings 37 mounted to the rods 35. On the other hand, the deck 34 is intended to be moved in the direction of arrow A by a tension spring 38. As shown, the deck 34 is shown as being held in a reproducing position against the bias of the tension spring 38 since a hood hole 39 bored through the deck 34 is engaged by a latch lever 40 provided on the platform 19. Although the detail of the latch lever is not fully illustrated, it is movably provided to the platform 19 at its rear side by a suitable support member (not shown). The latch lever 40 has one upper end upwardly extending through an opening (not shown) bored through the platform 19. The latch lever 40 is also adapted to allow the upper end thereof to be received in the hook hole 39 in the deck 34. The latch lever 40 is normally and upwardly urged by a spring ( not shown) to engage the hook hole 39 and is moved downwardly against the bias of the spring (not shown) to permit disengagement from the hook hole 39 when the play of the cartridge by a moving device the detail of which is not shown since it does not form this invention.

A rotatable capstan 41 is provided on he deck 34 to abut against the pinch roller 29 in the cartridge 18*a* which has been removed from the enclosure 17 and which rests on the high surface portion 19*a* of the platform 19. The capstan 41 is used to drivingly transport the tape 27 in the cartridge. Further, a magnetic head 42 for reproducing the tape 27 in the cartridge, an end-mark detector 43 for controlling operation of magnetic head shift means (not shown since this forms not part of the present invention) for changing over the record tracks of the magnetic tape within the cartridge 18*a* to be played by shifting the magnetic head 42, are also provided on the deck 34. The capstan 41 is rotatably supported by a suitable bearing (not shown) mounted on the deck 34 and upwardly extends through a hole (not shown) bored through the deck. The capstan 41 is rotatably driven in the direction of the arrow as shown by capstan driving means including a motor (not shown) mounted to the deck thereunder. In addition to the capstan 41 and the magnetic head 42, there are provided on the deck 34 guides 44, 45 for securing relative position of the cartridge 18*a* in the play position with respect to the deck. When the deck 34 is in the reproducing position, the capstan 41 abuts against the pinch roller 29 within the cartridge 18*a* in the play position and the tape 27 within the cartridge is drivingly transported across the magnetic head 42, as well known, by coaction of the capstan 41 with the pinch roller 29.

The tape cartridge player includes deck driving means for slidably moving the deck 34 between the reproducing position and a retracted position where the capstan 41 is disengaged from the pinch roller 29 within the cartridge 18*a*. The deck driving means has a rubber covered eccentric cam idler wheel 46 rotatably supported by an axis 47 attached to the one end of a support member 48 the other end of which is secured to the platform 19. The wheel 46 includes a step portion 49 at a portion of the periphery farthest away form the axis 45. The wheel 46 as will be fully described later is provided to oppose to the capstan 41 so as to allow it to abut against the capstan 41 and to be rotated in the direction of arrow C. When the deck 34 is retained in the reproducing position upon engagement of the hook hole 39 with the latch lever 40, the wheel 44 is regulated by the step portion 49 and keeps away from the capstan 41. If the latch lever 40 is moved to permit disengagement from the hook hole 39, the deck 34 is slided in the direction of arrow A from the reproducing position by the bias of the tension spring 38. This causes the capstan 41 to abut against the wheel 46 to rotatably drive the latter in the direction of arrow C. The deck 34 is gradually moved in the direction of arrow A under control of the eccentric cam idler wheel 46 at this moment. When the wheel 46 is rotated through about a half revolution, the deck 34 is moved to the retracted position farthest away from the reproducing position and then is moved in the direction of arrow B against the bias of the tension spring 38 as the wheel 46 is rotated. About one revolution of the wheel 46 returns the deck 34 to the reproducing position as shown and the deck 34 is prevented from further moving by engagement of the latch lever 40 with hook hole 39. The wheel 46 is rotated through one revolution until the maximum eccentric portion thereof passes over the capstan 41 and is regulated by the step portion 49 to establish disengagement from the capstan 41. The motor for rotating the capstan and the magnetic head shifting means are provided, though not shown in FIG. 3, below the deck 34 so that the platform 19 is provided with a suitable opening at a portion thereof opposed to the deck 34 to allow them to pass there through.

According to the invention, the tape cartridge removing apparatus functions to move the cartridge 18*a* placed on the platform 19 in the direction of arrow D to move it through the opening 20 in the side wall 13 of the cabinet outwardly of the cabinet 10 during the time that the deck 34 is reciprocally moved by the deck moving means between the reproducing position and the retracted position. The tape cartridge removing apparatus includes a pushing lever 50 slidably supported to be movable in the direction of the arrow as shown by a substantially L-shaped support or guide members 51, 52 fixed to the platform 19. The pushing lever 50 is provided at one end with a substantially U-shaped head member 53 integrated therewith. The head member 53 has bent portion 54, 55 and 56 upwardly extending from the peripheral edges thereof. A distance between the respective upper edges of the bent portions 54 to 56 and the platform 19 is less than the thickness of the cartridge 18. The pushing lever 50 is pivoted at its rear end by a pin 57 to a crank arm 58 one end of which is connected to the wheel 46 by a pivot pin 59.

The lowermost of the cartridge 18*a* of a plurality of them in a stack rests on the high surface 19*a* of the platform 19 and is positioned in the play position. The pushing lever 50 is positioned away from the side wall of the cartridge 18*a* as shown in FIG. 3. When the latch lever 40 is moved from the hook hole 39 to stop the play of the cartridge, the wheel 46 is rotated in the direction of arrow C upon abutment on the capstan 41. As the wheel 46 is rotated, the pushing lever 50 is leftwardly moved gradually by the crank arm 58 and is allowed to contact the cartridge 18*a* by the head member 53 urge the same whereat the wheel 46 is rotated through a half revolution. The deck 34 has been moved to allow the guide members 44, 45 to be away from the cartridge 18*a* prior to depression of the pushing lever 50 upon the cartridge 18*a*. Accordingly, the cartridge 18*a* is pushed by the pushing lever 50 and is moved in the direction of arrow D and then is moved out of the cabinet 10 through the opening 20 whereat the wheel 46 is rotated through a half revolution. Further rotation of the wheel 46 reverses movement of the pushing lever 50 while the head member 53 is away from the lower portion of a stack of the cartridges before the wheel 46 is rotated through one revolution whereby the next cartridge falls down on the platform 19 and is allowed to bring the play position. When the wheel 46 is rotated through one revolution, the deck 34 as above described is returned to the reproducing position and the capstan 41 and the magnetic head is engaged by the succeeded cartridge brought to the play position to start the play of the cartridge. As the wheel 46 is prevented from further rotation when it is rotated through 1 revolution, the pushing lever 50 is maintained at the position as shown in FIG. 3. Since the tape cartridge removing apparatus relies on rotational force of the capstan 41, it provides a strong force enough to move the tape cartridge in the play position to secure removal of the cartridge from the player under stable operation.

The tape player herein illustrated is adapted to play the tape cartridge in which the endless magnetic tape is stored, however, it will be understood that the tape cartridge removing apparatus of the invention may be well adapted to play the tape cartridge or cassette in which the ended magnetic tape is stored.

It is to be understood that the embodiments of the invention which have been described are merely illustration of the principal of the invention. Numerous modifications and changes may be made without departing from the true spirit and scope of the invention.

What is claimed is:

1. In a tape player utilizing a plurality of endless magnetic tape cartridges for playing a vertical stack of a plurality of cartridges from the lowermost to the uppermost in succession in a bottomless enclosure, a tape cartridge removing apparatus comprising a player cabinet; a horizontal platform in the player cabinet arranged below the bottomless enclosure and on which the lowermost cartridge rests; a movable deck on the platform; a rotatable capstan on said deck, said capstan being adapted to forcedly abut against a pinch roller in the lowermost cartridge held in a play position; the deck driving means for moving said deck between a reproducing position where the capstan engages the cartridge in the play position and a predetermined retracted position where the capstan is disengaged from the cartridge in the play position; a wheel member fixedly mounted on said platform for rotation about an axis parallel to the axis of rotation of said capstan, the wheel member being arranged adjacent to the capstan, said wheel member being operable to abut against the capstan and to be rotated thereby during the time when the deck is being reciprocally moved between said reproducing position and said retracted position; a pushing member slidably mounted on the platform for reciprocal movement toward and away from said cartridge in the play position, said pushing member having one end opposed to the side wall of the cartridge in the play position; and a connecting member pivotally and eccentrically mounted on the wheel member and pivotally connected to the pushing member, whereby the pushing member is reciprocally moved by the connecting member in relation to rotation of the wheel member and the pushing member presses the side wall of the cartridge in the play position when the pushing member is moved toward the cartridge to retract the cartridge from the play position.

2. A magnetic tape cartridge removing apparatus in accordance with claim 1, wherein said deck driving means includes bias means for normally urging said deck away from the cartridge in the play position, and said wheel member is caused to abut against the capstan under the bias of said bias means.

3. A magnetic tape cartridge removing apparatus in accordance with claim 1, wherein said cabinet has an opening, and the cartridge which is pressed by said pushing member is outwardly discharged from the cabinet through the opening.

* * * * *